United States Patent
Liu

(10) Patent No.: US 12,186,994 B2
(45) Date of Patent: Jan. 7, 2025

(54) GLUE-DISPENSING METHOD OF DISPLAY MODULE AND GLUE-DISPENSING DEVICE OF DISPLAY MODULE

(71) Applicant: WUHAN CHINA STAR OPTOELECTRONICS TECHNOLOGY CO., LTD., Wuhan (CN)

(72) Inventor: Biwu Liu, Wuhan (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 494 days.

(21) Appl. No.: 17/604,597

(22) PCT Filed: Aug. 6, 2021

(86) PCT No.: PCT/CN2021/111110
§ 371 (c)(1),
(2) Date: Oct. 18, 2021

(87) PCT Pub. No.: WO2023/004867
PCT Pub. Date: Feb. 2, 2023

(65) Prior Publication Data
US 2023/0031523 A1    Feb. 2, 2023

(30) Foreign Application Priority Data

Jul. 29, 2021 (CN) .......................... 202110861344.1

(51) Int. Cl.
B29C 65/52       (2006.01)
B05C 11/10       (2006.01)
(Continued)

(52) U.S. Cl.
CPC ........ *B29C 65/524* (2013.01); *B05C 11/1018* (2013.01); *B29C 2037/90* (2013.01); *B29L 2031/3475* (2013.01)

(58) Field of Classification Search
CPC ............. B05C 11/1005; B05C 11/1015; B05C 11/1021; B29L 2031/3475; G02F 1/1333
See application file for complete search history.

(56) References Cited

U.S. PATENT DOCUMENTS

2010/0120318 A1* 5/2010 Lin ....................... G02F 1/1333
                                                                    445/24

FOREIGN PATENT DOCUMENTS

CN      109530159 A  *  3/2019
CN      111291482 A     6/2020
(Continued)

*Primary Examiner* — Carson Gross
(74) *Attorney, Agent, or Firm* — The Roy Gross Law Firm, LLC; Roy Gross

(57) ABSTRACT

The present disclosure provides a glue-dispensing method of a display module and a glue-dispensing device of the display module. After the display module is fixed to a glue-dispensing platform, a region to be glue-dispensed of the display module is scanned in real time. And glue-dispensing terms are adjusted in real time according to scanning results, glue bodies formed by glue-dispensing are confirmed, and the glue-dispensing terms are deeply fine-tuned according to the glue bodies. Therefore, the embodiments of the present disclosure can achieve advanced prevention, process avoidance, a detection effect after completion, and a depth compensation according to the effect.

8 Claims, 7 Drawing Sheets

(51) Int. Cl.
*B29C 37/00* (2006.01)
*B29L 31/34* (2006.01)

(56) References Cited

FOREIGN PATENT DOCUMENTS

| | | | |
|---|---|---|---|
| CN | 112947264 A | | 6/2021 |
| KR | 101387955 B1 | * | 4/2014 |
| KR | 101799491 | * | 11/2017 |

* cited by examiner

GLUE-DISPENSING METHOD OF DISPLAY MODULE AND GLUE-DISPENSING DEVICE OF DISPLAY MODULE

CROSS REFERENCE TO RELATED APPLICATIONS

This application is a National Phase of PCT Patent Application No. PCT/CN2021/111110 having International filing date of Aug. 6, 2021, which claims priority to China Patent Application No. 202110861344.1, filed on Jul. 29, 2021. The contents of the above applications are incorporated herein by reference in their entirety.

TECHNICAL FIELD

The present disclosure relates to a field of display, and more particularly to a glue-dispensing method of a display module and a glue-dispensing device of the display module.

BACKGROUND

At present, in modern communication industries, display devices tend to develop with full screens and narrow bezels. Each display module includes a protective cover plate, a liquid crystal panel, and a backlight module. After the liquid crystal panel and the backlight module are attached, the protective cover plate is disposed above a liquid crystal module to improve service life of the display device. In order to improve a degree of bonding between the backlight module and the liquid crystal panel, usually after the liquid crystal module, the backlight module, and the protective cover plate are attached, glue is dispensed on side edges of the backlight module and the liquid crystal module.

From an air pressure type needle valve of traditional side edge sealant to a current injection piezoelectric valve, a coating aspect ratio of side edge sealant is higher and higher. Current products with narrow bezels or no bezels are produced substantially with fixed parameters such as a fixed air pressure, a temperature, a speed, a height, a tilt angle, and valve parameters when the injection piezoelectric valve is used for glue-dispensing. When glue-dispensing the display module, there may be different degrees of offset phenomena. If the display module is produced with the fixed parameters, bad phenomena such as a glue dent, light leakage, and high glue may be generated to different degrees, which may affect a yield of the display module.

Therefore, how to prevent a side edge glue-dispensing effect of the display module from being affected by offsets of the display module is a difficult problem for panel manufacturers to overcome.

SUMMARY

Embodiments of the present disclosure provide a glue-dispensing method of a display module and a glue-dispensing device of the display module, so as to solve at least one technical problem that a side edge glue-dispensing effect of the display module is affected by offsets of the display module in the prior art.

The embodiments of the present disclosure provide the glue-dispensing method of the display module, and the glue-dispensing method includes steps of:

Scanning a region to be glue-dispensed of the display module and obtaining first real time glue-dispensing parameters of the display module.

Setting first real time glue-dispensing terms according to the first real time glue-dispensing parameters and preset glue-dispensing terms.

Glue-dispensing the display module using the first real time glue-dispensing terms to form a glue body.

Obtaining an image of the glue body.

Setting second real time glue-dispensing terms according to the image of the glue body and the first real time glue-dispensing terms.

Glue-dispensing a subsequent display module using the second real time glue-dispensing terms.

Optionally, in some embodiments of the present disclosure, the first real time glue-dispensing parameters of the display module include a height and a width of the region to be glue-dispensed of the display module.

Optionally, in some embodiments of the present disclosure, the step of setting the first real time glue-dispensing terms according to the first real time glue-dispensing parameters and the preset glue-dispensing terms includes following steps:

Comparing preset glue-dispensing parameters and the first real time glue-dispensing parameters and obtaining offset data.

Setting the first real time glue-dispensing terms based on the preset glue-dispensing terms and according to the offset data when each of the offset data satisfies a preset term.

Optionally, in some embodiments of the present disclosure, the preset term is that each of ratios of each of the offset data to each of parameters corresponding to the preset glue-dispensing parameters is less than or equal to 10%.

Optionally, in some embodiments of the present disclosure, the preset glue-dispensing parameters include a preset glue width and a preset glue height, and the offset data includes a first deviation value and a second deviation value. The step of comparing the preset glue-dispensing parameters and the first real time glue-dispensing parameters and obtaining the offset data includes following steps:

Comparing the preset glue width with the width of the region to be glue-dispensed of the display module and obtaining the first deviation value.

Comparing the preset glue height with the height of the region to be glue-dispensed of the display module and obtaining the second deviation value.

Optionally, in some embodiments of the present disclosure, the step of setting the second real time glue-dispensing terms according to the image of the glue body and the first real time glue-dispensing terms includes following steps:

Obtaining the second real time glue-dispensing parameters according to the image of the glue body.

Comparing the first real time glue-dispensing parameters and the second real time glue-dispensing parameters and obtaining difference values of the first real time glue-dispensing parameters and the second real time glue-dispensing parameters.

Setting the second real time glue-dispensing terms based on the first real time glue-dispensing terms and according to the difference values when at least one of the difference values is greater than a preset value.

Optionally, in some embodiments of the present disclosure, the preset value is 0.1 micrometer.

Optionally, in some embodiments of the present disclosure, the difference values include a first sub-difference value and a second sub-difference value. The step of comparing the first real time glue-dispensing parameters and the second real time glue-dispensing parameters and obtaining the difference values of the first real time glue-dispensing parameters and the second real time glue-dispensing parameters includes following steps:

Comparing the width of the region to be glue-dispensed of the display module with a glue width of the glue body and obtaining the first sub-difference value.

Comparing the height of the region to be glue-dispensed of the display module with a glue height of the glue body and obtaining the second sub-difference value Optionally, in some embodiments of the present disclosure, before the step of scanning the region to be glue-dispensed of the display module, the method further including:

Fixing the display module to a glue-dispensing platform.

Determining whether the region to be glue-dispensed of the display module is in a horizontal state or not.

Calibrating the region to be glue-dispensed of the display module to the horizontal state when the region to be glue-dispensed of the display module is not in the horizontal state.

The embodiments of the present disclosure provide the glue-dispensing device of the display module, including:

A scanning module configured to scan a region to be glue-dispensed of the display module and obtain first real time glue-dispensing parameters of the display module.

A first setting module configured to set first real time glue-dispensing terms according to the first real time glue-dispensing parameters and preset glue-dispensing terms.

A glue-dispensing module configured to glue-dispense the display module using the first real time glue-dispensing terms to form a glue body.

An obtainment module configured to obtain an image of the glue body.

A second setting module configured to set second real time glue-dispensing terms according to the image of the glue body and the first real time glue-dispensing terms.

The glue-dispensing module is further configured to glue-dispense a subsequent display module using the second real time glue-dispensing terms Optionally, in some embodiments of the present disclosure, the first real time glue-dispensing parameters of the display module include a height and a width of the region to be glue-dispensed of the display module.

Optionally, in some embodiments of the present disclosure, the first setting module includes:

A first comparison unit configured to compare preset glue-dispensing parameters with the first real time glue-dispensing parameters, and obtain offset data.

A first setting unit configured to set the first real time glue-dispensing terms based on the preset glue-dispensing terms and according to offset data when each of the offset data satisfies a preset term.

Optionally, in some embodiments of the present disclosure, the preset term is that each of ratios of each of the offset data to each of parameters corresponding to the preset glue-dispensing parameters is less than or equal to 10%.

Optionally, in some embodiments of the present disclosure, the preset glue-dispensing parameters include a preset glue width and a preset glue height, and the offset data includes a first deviation value and a second deviation value.

Optionally, in some embodiments of the present disclosure, the first comparison unit is configured to compare the preset glue width with the width of the region to be glue-dispensed of the display module, and obtain the first deviation value, and the first comparison unit is further configured to compare the preset glue height with the height of the region to be glue-dispensed of the display module, and obtain the second deviation value.

Optionally, in some embodiments of the present disclosure, the second setting module includes:

An obtainment unit configured to obtain the second real time glue-dispensing parameters according to the image of the glue body.

A second comparison unit configured to compare the first real time glue-dispensing parameters with the second real time glue-dispensing parameters and obtain difference values of the first real time glue-dispensing parameters and the second real time glue-dispensing parameters.

A second setting unit configured to set the second real time glue-dispensing terms based on the first real time glue-dispensing terms and according to the difference values when at least one of the difference values is greater than a preset value.

Optionally, in some embodiments of the present disclosure, he preset value is 0.1 micrometer.

Optionally, in some embodiments of the present disclosure, the difference values include a first sub-difference value and a second sub-difference value, the second real time glue-dispensing parameters include a glue width of the glue body and a glue height of the glue body.

Optionally, in some embodiments of the present disclosure, the second comparing unit is configured to compare the width of the region to be glue-dispensed of the display module with the glue width of the glue body and obtain the first sub-difference value, and the second comparing unit is further configured to compare the height of the region to be glue-dispensed of the display module with the glue height of the glue body, and obtain the second sub-difference value.

Optionally, in some embodiments of the present disclosure, the glue-dispensing device further includes:

A fixing module configured to fix the display module on the glue-dispensing platform.

A determining module configured to determine whether the region to be glue-dispensed of the display module is in a horizontal state or not.

A calibration module configured to calibrate the region to be glue-dispensed of the display module to the horizontal state when the region to be glue-dispensed of the display module is not in the horizontal state.

The embodiments of the present disclosure provide the glue-dispensing method of the display module and the glue-dispensing device of the display module. After the display module is fixed to the glue-dispensing platform, the region to be glue-dispensed of the display module is scanned in real time. And glue-dispensing terms are adjusted in real time according to scanning results, so as to realize different glue-dispensing glue bodies required by different glue-dispensing positions during glue-dispensing process of the display module. And the glue bodies formed by glue-dispensing are confirmed, the glue-dispensing terms are deeply fine-tuned according to the glue bodies. Therefore, the embodiments of the present disclosure are able to achieve advanced prevention, process avoidance, detection effect after completion, and depth compensation according to the effect, thereby preventing bad phenomena such as glue dent, light leakage, and high glue, etc., and further improving the yield of the display module.

DESCRIPTION OF DRAWINGS

In order to more clearly explain the technical solutions in the embodiments of the present disclosure, the following briefly introduces the drawings used in description of the embodiments. Obviously, the drawings in the following description are only some embodiments of the present disclosure. For those skilled in the art, other drawings may be obtained based on these drawings without creative work.

DETAILED DESCRIPTION OF PREFERRED EMBODIMENTS

The following embodiments refer to the accompanying drawings for exemplifying specific implementable embodiments of the present disclosure in a suitable computing environment. It should be noted that the exemplary described embodiments are configured to describe and understand the present disclosure, but the present disclosure is not limited thereto.

In the descriptions of the present disclosure, the terms "length", "width", "thickness", "upper", "lower", and other indicated directions or the position relation are based on the orientation or position relation shown in the figures. Only for convenience of describing the present disclosure and the simplification of the description, rather than indicating or implying that the means or elements referred to have a specific orientation, so that the above directions of the present disclosure cannot be understood as limitations. In the description of the present disclosure, the meanings of "multiple" are two or more, unless specifically limited otherwise.

In the descriptions of the present disclosure, the terms "first" and "second" are used only for purposes of description, and cannot be understood to indicate or imply a relative importance or to implicitly indicate the number of technical features indicated. Thus, the features "first" and "second" can be expressly or implicitly included in one or more of the features, so that the above directions of the present disclosure cannot be understood as limitations.

The embodiments of the present disclosure provide the glue-dispensing method of the display module and the glue-dispensing device of the display module, which are described in detail below. It should be noted that description order of the following embodiments is not intended to limit preferred order of the embodiments.

Figure 1:
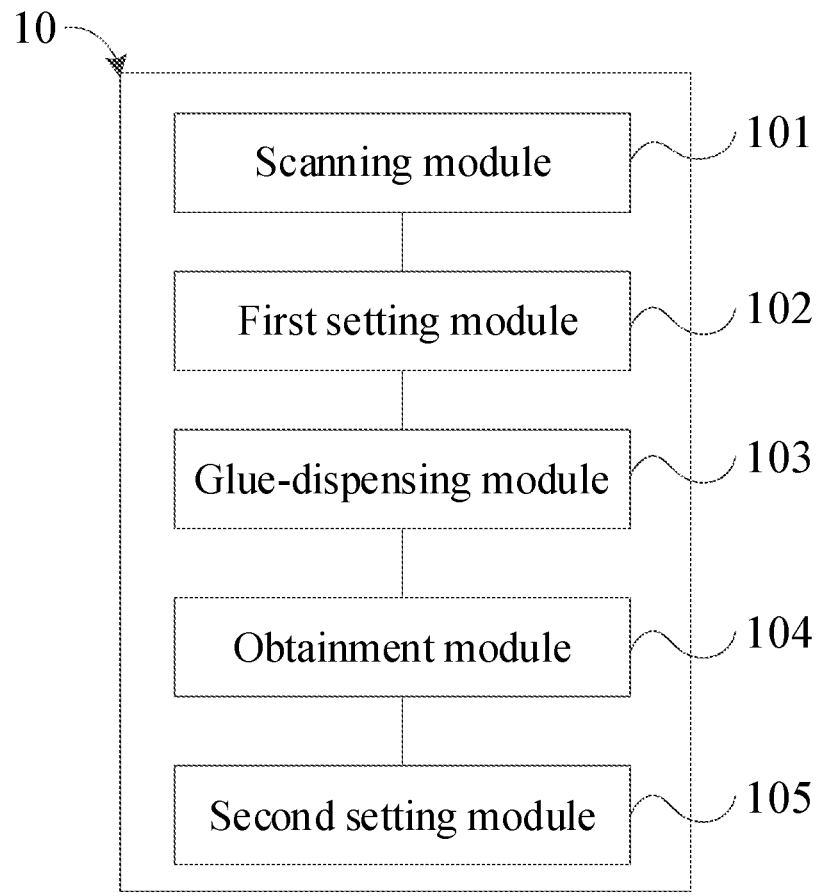
FIG. 1 is a first structural diagram of a glue-dispensing device of a display module provided by an embodiment of the present disclosure.
Figure 2:
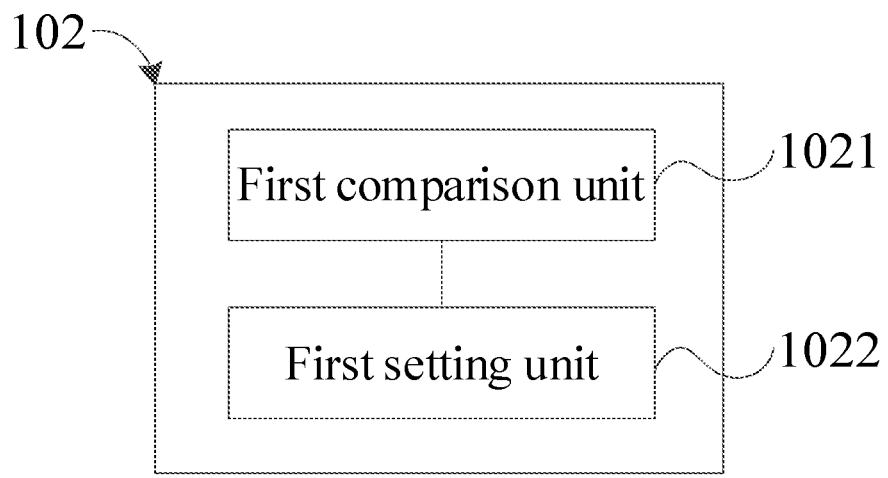
FIG. 2 is a schematic structural diagram of a first setting module of a glue-dispensing device of a display module provided by an embodiment of the present disclosure.
Figure 3:
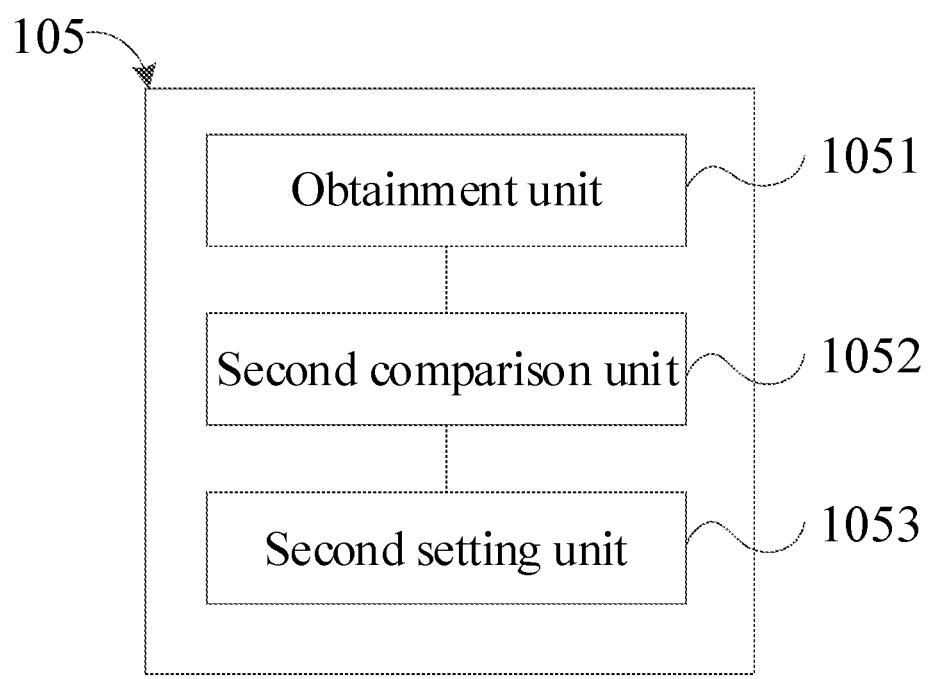
FIG. 3 is a schematic structural diagram of a second setting module of a glue-dispensing device of a display module provided by an embodiment of the present disclosure.

Please refer to FIG. 1, FIG. 2, and FIG. 3, FIG. 1 is a first structural diagram of a glue-dispensing device of the display module provided by an embodiment of the present disclosure. As shown in FIG. 1, the glue-dispensing device 10 of the display module includes a scanning module 101, a first setting module 102, a glue-dispensing module 103, an obtainment module 104, and a second setting module 105.

It should be noted that the scanning module 101 is configured to scan a region to be glue-dispensed of the display module, and obtain first real time glue-dispensing parameters of the display module.

It should be noted that the first setting module 102 is configured to set first real time glue-dispensing terms according to the first real time glue-dispensing parameters and preset glue-dispensing terms. The first real time glue-dispensing terms are used to glue-dispense the display module, which realizes different glue body types required by different regions to be glue-dispensed during a glue-dispensing process of the display module, thereby preventing bad phenomena such as a glue dent, light leakage, and high glue, etc., and further improving a yield of the display module.

It should be noted that the glue-dispensing module 103 is configured to glue-dispense the display module using the first real time glue-dispensing terms to form a glue body.

It should be noted that the obtainment module 104 is configured to obtain an image of the glue body.

It should be noted that the second setting module 105 is configured to set second real time glue-dispensing terms according to the image of the glue body and the first real time glue-dispensing terms. Conditions such as air pressure of glue and an environment temperature are different at different times. Therefore, the second real time glue-dispensing terms need to be set according to a real time effect of the glue body formed by glue-dispensing, so that a glue width of a glue-dispensing portion is better matched with a width of a region to be glue-dispensed of the display module, and a glue height of the glue-dispensing portion is better matched with a height of the region to be glue-dispensed of the display module, thereby preventing bad phenomena such as the glue dent, the light leakage, and the high glue, etc., and further improving the yield of the display module.

It should be noted that glue-dispensing module 103 is further configured to glue-dispense a subsequent display module using the second real time glue-dispensing terms.

FIG. 2 is a schematic structural diagram of a first setting module of a glue-dispensing device of a display module provided by an embodiment of the present disclosure. As shown in FIG. 2, the first setting module 102 includes a first comparison unit 1021 and a first setting unit 1022.

It should be noted that the first comparison unit 1021 is configured to compare preset glue-dispensing parameters with the first real time glue-dispensing parameters, and obtain offset data. The first setting unit 1022 is configured to set the first real time glue-dispensing terms based on the preset glue-dispensing terms and according to the offset data when each of the offset data satisfies a preset term. Wherein the preset term is that each of ratios of each of the offset data to each of parameters corresponding to the preset glue-dispensing parameters is less than or equal to 10%.

It should be noted that the preset glue-dispensing parameters include a preset glue width and a preset glue height, and the offset data includes a first deviation value and a second deviation value. The first comparison unit 1021 is configured to compare the preset glue width with the width of the region to be glue-dispensed of the display module, and obtain the first deviation value, and the first comparison unit 1021 is further configured to compare the preset glue height with the height of the region to be glue-dispensed of the display module, and obtain the second deviation value.

FIG. 3 is a schematic structural diagram of a second setting module of a glue-dispensing device of a display module provided by an embodiment of the present disclosure. As shown in FIG. 3, the second setting module 105 includes an obtainment unit 1051, a second comparison unit 1052, and a second setting unit 1053.

It should be noted that the obtainment unit 105 is configured to obtain the second real time glue-dispensing parameters according to the image of the glue body. The second comparison unit 1052 is configured to compare the first real time glue-dispensing parameters with the second real time glue-dispensing parameters, and obtain difference values of the first real time glue-dispensing parameters and the second real time glue-dispensing parameters. The second setting unit 1053 is configured to set the second real time glue-dispensing terms based on the first real time glue-dispensing terms and according to the difference values when at least one of the difference values is greater than a preset value. Wherein the preset value is 0.1 micrometer.

It should be noted that the second comparing unit 1052 is configured to compare the width of the region to be glue-dispensed of the display module with the glue width of the glue body and obtain the first sub-difference value, and the second comparing unit 1052 is further configured to compare the height of the region to be glue-dispensed of the display module with the glue height of the glue body and obtain the second sub-difference value.

Figure 4:
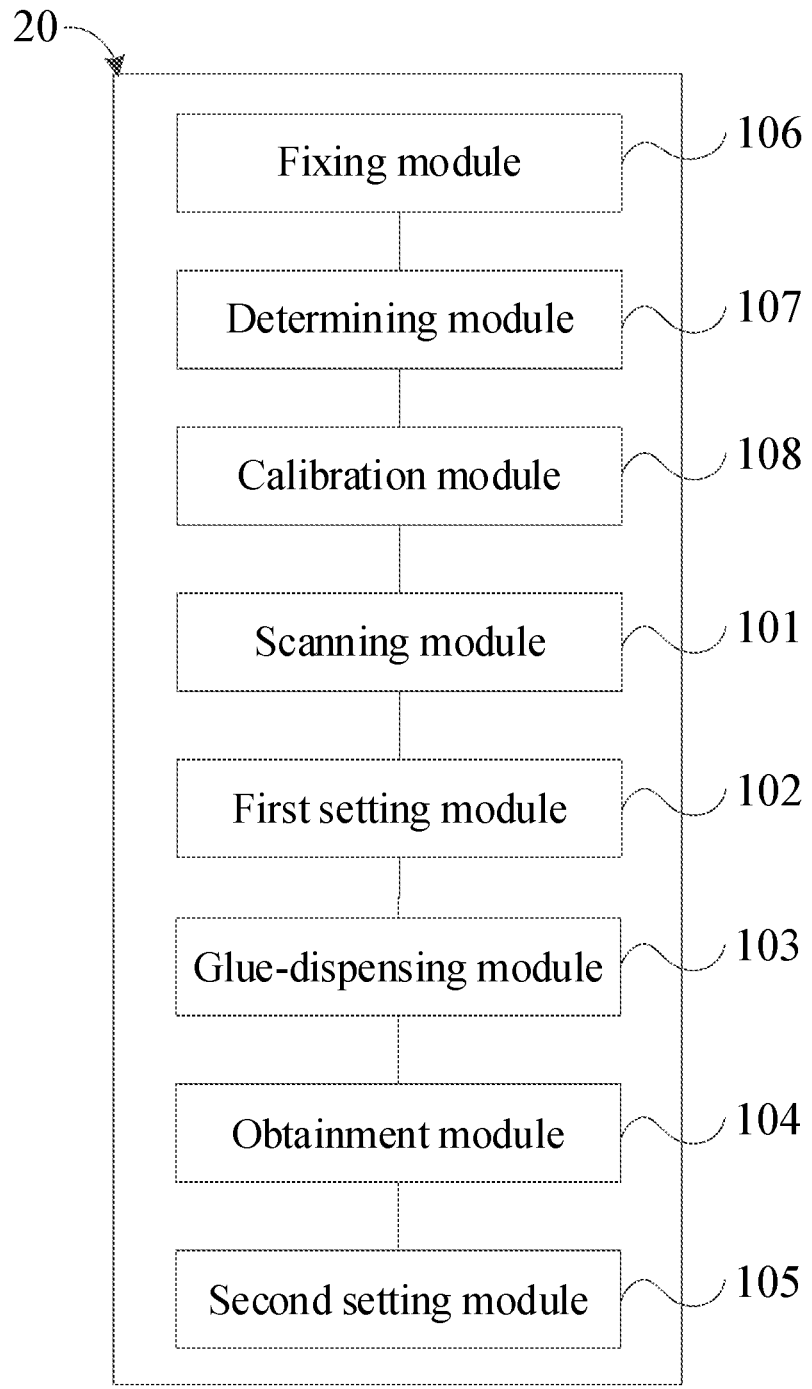
FIG. 4 is a second structural diagram of a glue-dispensing device of a display module provided by an embodiment of the present disclosure.

Please refer to FIG. 4, FIG. 4 is a second structural diagram of a glue-dispensing device of a display module provided by an embodiment of the present disclosure. The difference between a glue-dispensing device 20 of this embodiment and the glue-dispensing device 10 of the above embodiments is that the glue-dispensing device 20 further includes a fixing module 106, a determining module 107, and a calibration module 108.

It should be noted that the fixing module 106 is configured to fix the display module on the glue-dispensing platform. The determining module 107 is configured to determine whether the region to be glue-dispensed of the display module is in a horizontal state or not. The calibration module 108 is configured to calibrate the region to be glue-dispensed of the display module to the horizontal state when the region to be glue-dispensed of the display module is not in the horizontal state.

In the glue-dispensing device of the display module provided in the present disclosure, after the display module is fixed to the glue-dispensing platform, the region to be glue-dispensed of the display module is scanned in real time. And the glue-dispensing terms are adjusted in real time according to scanning results, so as to realize different glue-dispensing glue bodies are required by different glue-dispensing positions during the glue-dispensing process of the display module. And the glue bodies formed by glue-dispensing are confirmed, and the glue-dispensing terms are deeply fine-tuned according to the glue bodies. Therefore, the embodiments of the present disclosure are able to achieve advanced prevention, process avoidance, a detection effect after completion, and a depth compensation according to the effect, thereby preventing bad phenomena such as the glue dent, the light leakage, and the high glue, etc., and further improving the yield of the display module.

Figure 5:
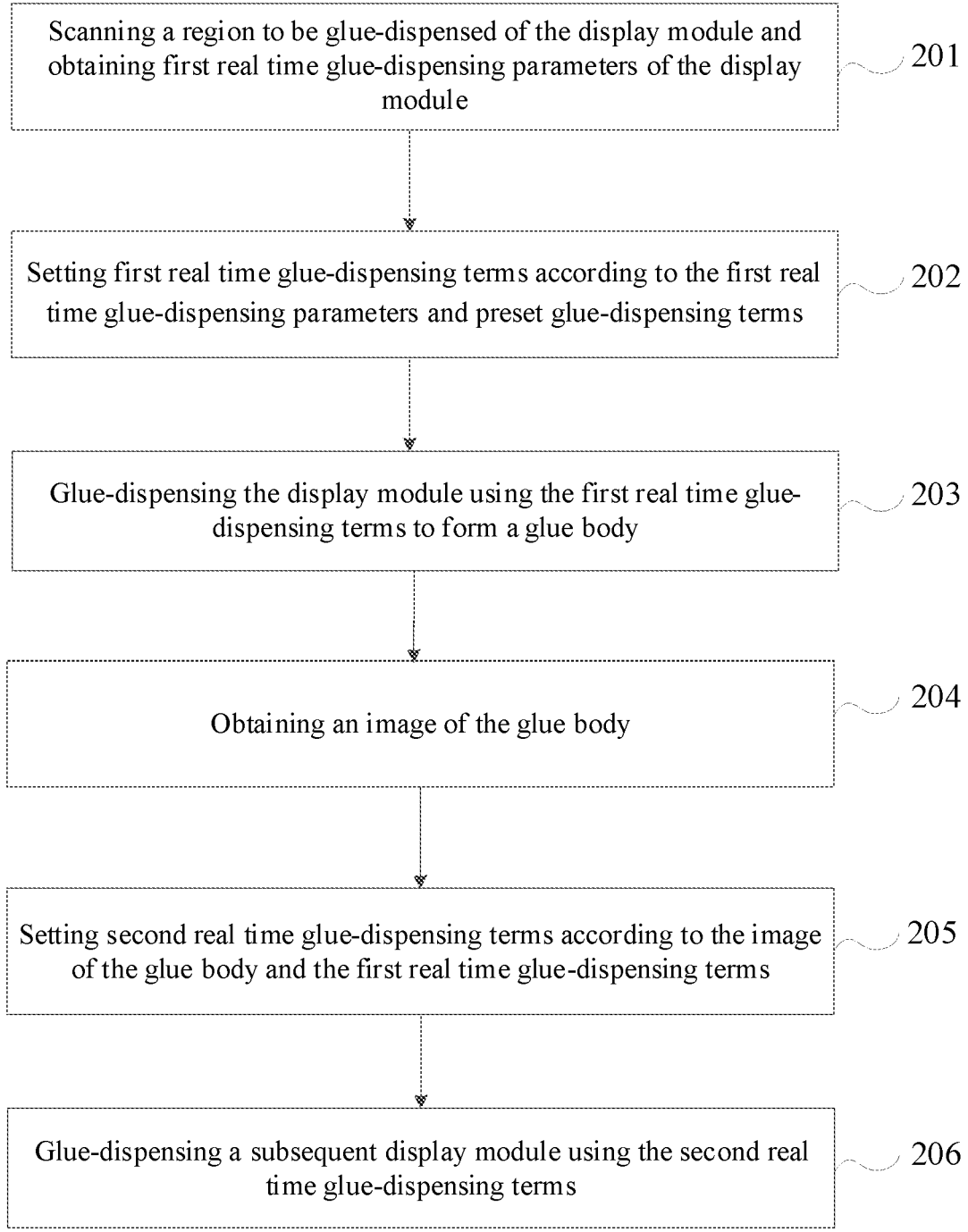
FIG. 5 is a first flow diagram of a glue-dispensing method of a display module provided by an embodiment of the present disclosure.

Refer to FIG. 5, FIG. 6, FIG. 7, FIG. 8, and FIG. 9, FIG. 5 is a first flow diagram of a glue-dispensing method of a display module provided by an embodiment of the present disclosure. As shown in FIG. 5, the glue-dispensing method of the display module includes the following steps:

Step 201: scanning a region to be glue-dispensed of the display module, and obtaining first real time glue-dispensing parameters of the display module.

It should be noted that the display module includes a backlight module, a display panel, and a protective cover plate which are sequentially stacked. In order to improve stability of the display module, the display module is usually glue-dispensed after the protective cover plate, the liquid crystal panel, and the backlight module are attached, so as to improve a degree of bonding of the backlight module, the display panel, and the protective cover plate. The region to be glue-dispensed of the display module is a cavity formed by the backlight module, the display panel, and the protective cover plate. By dispensing glue in the cavity, the degree of bonding between the backlight module, the display panel, and the protective cover plate can be improved.

It should be noted that the first real time glue-dispensing parameters of the display module includes a height and a width of the region to be glue-dispensed of the display module. The height and the width of the region to be glue-dispensed of the display module are obtained by scanning the region to be glue-dispensed of the display module.

It should be noted that a 2D laser profiler or a 2.5D camera is used to scan the region to be glue-dispensed of the display module to obtain the first real time glue-dispensing parameters. The first real time glue-dispensing parameters include the height, the width, and a length of the region to be glue-dispensed of the display module.

Specifically, the 2.5D camera illuminates from different angles by controlling a light source, so as to obtain a shadow image generated by image concave-convex information of the region to be glue-dispensed of the display module. Through image information in the shadow image of the region to be glue-dispensed of the display module, the width and the length of the region to be glue-dispensed of the display module can be obtained. The height of the region to be glue-dispensed of the display module is able to be obtained through grayscale information in the shadow image of the region to be glue-dispensed of the display module.

Specifically, the 2D laser profiler can scan plane information and height information of the region to be glue-dispensed of the display module. Therefore, the height, the width, and the length of the region to be glue-dispensed can be directly obtained by using the 2D laser profiler.

It should be noted that when the 2D laser profiler or the 2.5D camera is used to scan the region to be glue-dispensed of the display module to obtain the first real time glue-dispensing parameters of the display module, the 2D laser profiler and the region to be glue-dispensed of the display module are in a vertical state, and the 2.5D camera is disposed right above the region to be glue-dispensed of the display module.

Step 202: setting first real time glue-dispensing terms according to the first real time glue-dispensing parameters and preset glue-dispensing terms.

It should be noted that the preset glue-dispensing terms include a single point glue amount, a single point diameter, and a glue-dispensing frequency of a glue-dispensing portion. By controlling the single point glue amount, the single point diameter, and the frequency of the glue-dispensing portion, a glue width and a glue height of the glue-dispensing portion can be controlled, so that the glue width of the glue-dispensing portion is matched with the width of the region to be glue-dispensed of the display module, and the glue height of the glue-dispensing portion is matched with the height of the region to be glue-dispensed of the display module.

Step 203: glue-dispensing the display module using the first real time glue-dispensing terms to form a glue body.

It should be noted that the first real time glue-dispensing terms are based on the preset dispensing terms and the first real time glue-dispensing terms is set according to the first real time glue-dispensing parameters of the display module. Therefore, the first real time glue-dispensing terms are used to glue-dispense the display module, which realizes different glue body types are required by different regions to be glue-dispensed during the glue-dispensing process of the display module, thereby preventing bad phenomena such as glue dent, light leakage, and high glue, etc., and further improving a yield of the display module.

Step 204: obtaining an image of the glue body.

It should be noted that conditions such as air pressure of the glue and an environment temperature are different at different times. Therefore, the glue-dispensing terms need to be set according to a real time effect of the glue body formed by glue-dispensing, so that the glue width of the glue-dispensing portion is better matched with the width of the region to be glue-dispensed of the display module, and the glue height of the glue-dispensing portion is matched with the height of the region to be glue-dispensed of the display module, thereby preventing bad phenomena such as the glue dent, the light leakage, and the high glue, etc., and further improving the yield of the display module.

Step 205: setting second real time glue-dispensing terms according to the image of the glue body and the first real time glue-dispensing terms.

Step 206: glue-dispensing a subsequent display module using the second real time glue-dispensing terms.

Figure 6:
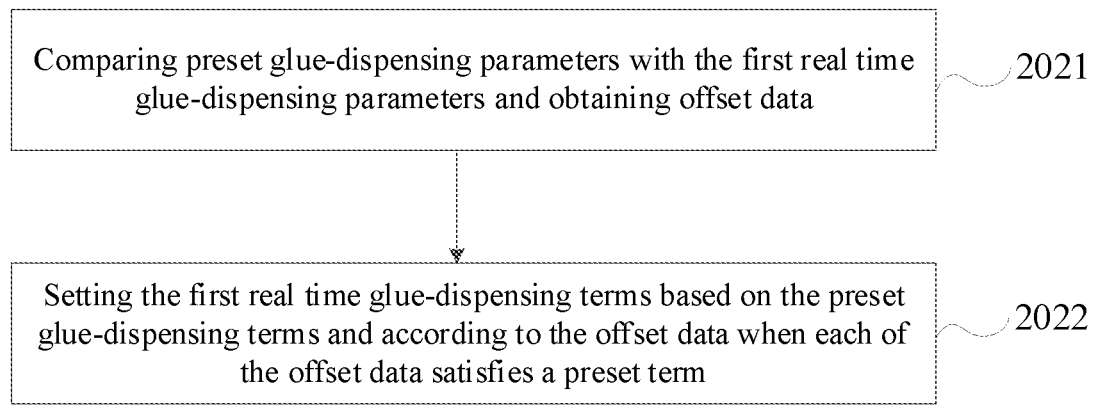
FIG. 6 is a first sub-flow diagram of a glue-dispensing method of a display module provided by an embodiment of the present disclosure.

FIG. 6 is a first sub-flow diagram of the glue-dispensing method of the display module provided by an embodiment of the present disclosure. As shown in FIG. 6, the step 202 includes:

Step 2021: comparing preset glue-dispensing parameters and the first real time glue-dispensing parameters and obtaining offset data.

It should be noted that the preset glue-dispensing parameters of display module glue-dispensing include a preset glue width and a preset glue height of the display module glue-dispensing.

Step 2022: setting the first real time glue-dispensing terms based on the preset glue-dispensing terms and according to the offset data when each of the offset data satisfies a preset term.

It should be noted that the preset term is that each of ratios of each of the offset data to each of parameters corresponding to the preset glue-dispensing parameters is less than or equal to 10%.

It should be noted that when each of ratios of each of the offset data to each of parameters corresponding to the preset glue-dispensing parameters is less than or equal to 10%, the first real time glue-dispensing terms are set based on the preset glue-dispensing terms and according to the offset data. The first real time glue-dispensing terms are used to glue-dispense the display module, so that the glue width of the glue-dispensing portion is matched with the width of the region to be glue-dispensed of the display module, and the glue height of the glue-dispensing portion is matched with the height of the region to be glue-dispensed of the display module. Specifically, by controlling the single point glue amount, the single point diameter, and the frequency of the glue-dispensing portion, the glue width of the glue-dispensing portion is matched with the width of the region to be glue-dispensed of the display module, and the glue height of the glue-dispensing portion is matched with the height of the region to be glue-dispensed of the display module, so as to improve the yield of the display module.

It should be noted that the single point glue amount and the single point diameter of the glue-dispensing portion are adjusted by adjusting a valve opening time of the glue-dispensing portion, stroke of a firing pin inside the glue-dispensing portion, a glue-dispensing delay time of the glue-dispensing portion, a rise time of the firing pin inside the glue-dispensing portion, and a falling time of the firing pin inside the glue-dispensing portion. The glue-dispensing frequency of the glue-dispensing portion is adjusted by a motor for moving the glue-dispensing portion and a motor for moving the glue-dispensing platform.

It should be noted that three side edges of the display module need to be glue-dispensed. At vertexes of the display module, there are joint portions form C angle to straight line, straight line to C angle, R angle to straight line, and straight line to R angle. Therefore, through adjusting the glue-dispensing frequency of the glue-dispensing portion by adjusting the motor for moving the glue-dispensing portion and the motor for moving the glue-dispensing platform, a synchronous long-distance variable speed can be achieved. Therefore, phenomena of convex points and non-smooth transitions at the above-mentioned joint portions are avoided, and the yield of the display module is improved.

It should be noted that, when the glue-dispensing portion is glue-dispensing, two stages of filling glue into the glue-dispensing portion and hitting the glue with the firing pin to make the glue flow out of the glue-dispensing portion are performed cyclically to realize glue-dispensing. Specifically, when the firing pin is used to hit the glue to make the glue flow out of the glue-dispensing portion, the firing pin inside the glue-dispensing portion moves a certain distance, and then the firing pin hits the glue at the glue-dispensing portion, and the glue is collided out of the glue-dispensing portion, so that the glue flows out of the glue-dispensing portion.

It should be noted that the valve opening time of the glue-dispensing portion is a time used by the firing pin to hit the glue. When the valve opening time of the glue-dispensing portion is increased, a distance that the firing pin needs to move in a unit time is smaller, thereby reducing a strength of the firing pin hitting the glue, so that the single point diameter of the glue-dispensing portion becomes smaller and a single point glue height becomes higher. When the valve opening time of the glue-dispensing portion is reduced, the distance that the firing pin needs to move in the unit time is greater, thereby increasing the strength of the firing pin hitting the glue, so that the single point diameter of the glue-dispensing portion becomes larger and the single point glue height becomes lower. Therefore, by adjusting the valve opening time of the glue-dispensing portion, the single point diameter and the single point glue height of the glue-dispensing portion can be adjusted.

It should be noted that when the stroke of the firing pin inside the glue-dispensing portion is increased, the distance that the firing pin needs to move in the unit time is increased, thereby increasing the strength of the firing pin hitting the glue, so that the single point diameter of the glue-dispensing portion becomes larger and the single point glue height becomes lower. When the stroke of the firing pin inside the glue-dispensing portion is reduced, the distance that the firing pin needs to move in the unit time becomes smaller, thereby reducing the strength of the firing pin hitting the glue, so that the single point diameter of the glue-dispensing portion becomes smaller and the single point glue height of the glue-dispensing portion becomes higher. Therefore, by adjusting the stroke of the firing pin inside the glue-dispensing portion, the single point diameter and the single point glue height of the glue-dispensing portion can be adjusted.

It should be noted that the glue-dispensing delay time of the glue-dispensing portion is a time for filling the glue into the glue-dispensing portion. When the glue-dispensing delay time of the glue-dispensing portion is increased, the time for filling the glue into the glue-dispensing portion is increased, so that the single point glue amount of the glue-dispensing portion is increased. When the glue-dispensing delay time of the glue-dispensing portion is reduced, the time for filling the glue into the glue-dispensing portion is reduced, so that the single point glue amount of the glue-dispensing portion is reduced. Therefore, the single point glue amount of the glue-dispensing portion can be adjusted by adjusting the glue-dispensing delay time of the glue-dispensing portion.

It should be noted that when the rising time of the firing pin inside the glue-dispensing portion is reduced, the distance that the firing pin needs to move in the unit time becomes larger, thereby increasing the strength of the firing pin hitting the glue, so that the single point diameter of the glue-dispensing portion becomes larger and the single point glue height becomes lower. When the rising time of the firing pin inside the glue-dispensing portion is increased, the distance that the firing pin needs to move in the unit time becomes smaller, thereby reducing the strength of the firing pin hitting the glue, so that the single point diameter of the glue-dispensing portion becomes smaller and the single point glue height becomes higher. Therefore, the single point diameter and the single point glue height of the glue-dispensing portion can be adjusted by adjusting the rising time of the firing pin in the glue-dispensing portion.

It should be noted that when the falling time of the firing pin inside the glue-dispensing portion is reduced, the distance that the firing pin needs to move in the unit time becomes larger, thereby increasing the strength of the firing pin hitting the glue, so that the single point diameter of the glue-dispensing portion becomes larger and the single point glue height becomes lower. When the falling time of the firing pin inside the glue-dispensing portion is increased, the distance that the firing pin needs to move in the unit time becomes smaller, thereby reducing the strength of the firing pin hitting the glue, so that the single point diameter of the glue dispensing portion becomes smaller and the single point glue height of the glue dispensing portion becomes higher. Therefore, the single point diameter and the single point glue height of the glue-dispensing portion can be adjusted by adjusting the falling time of the firing pin in the glue-dispensing portion.

It should be noted that when each of the ratios of each of the offset data to each of parameters corresponding to the preset glue-dispensing parameters is less than or equal to 4%, an offset degree of the display module is relatively slight. At this time, the single point glue amount and the single point diameter of the glue-dispensing portion can be adjusted by adjusting the valve opening time of the glue-dispensing portion, the stroke of the firing pin inside the glue-dispensing portion, and the glue-dispensing delay time of the glue-dispensing portion.

It is assumed that one of the offset data is 0.3 micrometer, and one of the parameters corresponding to the preset glue-dispensing parameters is 10 micrometers. In this case, one of the ratios of one of the offset data to one of the parameters corresponding to the preset glue-dispensing parameters is 3%, and one of the ratios of one of the offset data to one of the parameters corresponding to the preset glue-dispensing parameters is less than or equal to 4%.

It should be noted that when each of the ratios of each of the offset data to each of the parameters corresponding to the preset glue-dispensing parameters is greater than 4% and less than or equal to 7%, the offset degree of the display module is a medium degree. At this time, the single point glue amount and the single point diameter of the glue-dispensing portion can be adjusted by adjusting the valve opening time of the glue-dispensing portion, the stroke of the firing pin inside the glue-dispensing portion, the glue-dispensing delay time of the glue-dispensing portion, the rising time of the firing pin inside the glue-dispensing portion, and the falling time of the firing pin inside the glue-dispensing portion.

It is assumed that one of the offset data is 0.5 micrometer, and one of the parameters corresponding to the preset glue-dispensing parameters is 10 micrometers. In this case, one of the ratios of one of the offset data to one of the parameters corresponding to the preset glue-dispensing parameters is 5%, and one of the ratios of one of the offset data to one of the parameters corresponding to the preset glue-dispensing parameters is greater than 4% and less than or equal to 7%.

It should be noted that when each of the ratios of each of the offset data to each of parameters corresponding to the preset glue-dispensing parameters is greater than 7% and less than or equal to 10%, the offset degree of the display module is a severe degree. At this time, the single point glue amount and the single point diameter of the glue-dispensing portion can be adjusted by adjusting the glue-dispensing delay time of the glue-dispensing portion, the rising time of the firing pin inside the glue-dispensing portion, and the falling time of the firing pin inside the glue-dispensing portion.

It is assumed that one of the offset data is 0.8 micrometer, and one of the parameters corresponding to the preset glue-dispensing parameters is 10 micrometers. In this case, one of the ratios of one of the offset data to the one of the parameters corresponding to the preset glue-dispensing parameters is 8%, and one of the ratios of one of the offset data to one of the parameters corresponding to the preset glue-dispensing parameters is greater than 7% and less than or equal to 10%.

It should be noted that when each of the ratios of each of the offset data to each of parameters corresponding to the preset glue-dispensing parameters does not satisfy the preset term, the display module is abandoned for glue-dispensing. Specifically, when each of the ratios of each of the offset data to each of parameters corresponding to the preset glue-dispensing parameters is greater than 10%, the display module is abandoned for glue-dispensing.

It is assumed that one of the offset data is 1.2 micrometers, and one of the parameters corresponding to the preset dispensing parameters is 10 micrometers. In this case, one of the ratios of one of the offset data to one of the parameters corresponding to the preset glue-dispensing parameters is 12%, and one of the ratios of one of the offset data to one of the parameters corresponding to the preset glue-dispensing parameters is greater than 10%.

It should be noted that the glue width and the glue height of the glue-dispensing portion can be adjusted by adjusting the single point glue amount, the single point diameter, and the frequency of the glue-dispensing portion. However, adjustment degrees of the single point glue amount, the single point diameter, and the frequency of the glue-dispensing portion are limited. When one of the ratios of one of the offset data to one of the parameters corresponding to the preset glue-dispensing parameters is too large, glue types of the glue-dispensing portion cannot be adjusted to meet requirements by adjusting the single point glue amount, the single point diameter, and the frequency of the glue-dispensing portion. Therefore, when one of the ratios of one of the offset data to one of the parameters corresponding to the preset glue-dispensing parameters does not satisfy the preset term, the display module is abandoned for glue-dispensing.

Figure 7:
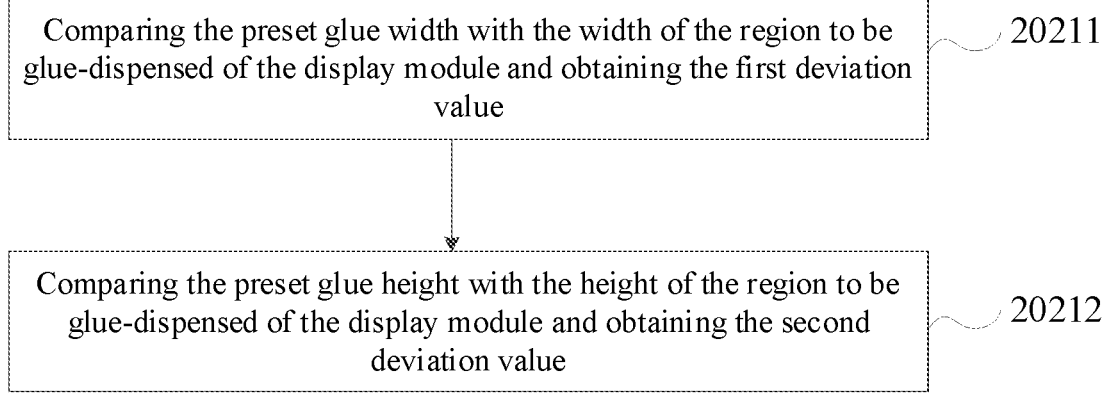
FIG. 7 is a second sub-flow diagram of a glue-dispensing method of a display module provided by an embodiment of the present disclosure.

FIG. 7 is a second sub-flow diagram of a glue-dispensing method of a display module provided by an embodiment of the present disclosure. As shown in FIG. 7, the step 2021 includes:

Step 20211: comparing the preset glue width with the width of the region to be glue-dispensed of the display module and obtaining the first deviation value.

Step 20212: comparing the preset glue height with the height of the region to be glue-dispensed of the display module and obtaining the second deviation value.

It should be noted that the preset glue-dispensing parameters include a preset glue length, a preset glue width, and a preset glue height. The preset glue length is same as a length of the side edges of the display module, and the length of the region to be glue-dispensed of the display module is also same as the length of the side edges of the display module. Therefore, only the preset glue width and the preset glue height need to be considered.

The offset data includes the first deviation value and the second deviation value. The first deviation value is a deviation value between the preset glue width and the width of the region to be glue-dispensed of the display module. The second deviation value is a deviation value between the preset glue height and the height of the region to be glue-dispensed of the display module.

Only when a ratio of the first deviation value to the preset glue width and a ratio of the second deviation value to the preset glue height are less than or equal to 10%, the first real time glue-dispensing terms are set based on the preset glue-dispensing terms and according to the offset data. When the ratio of the first deviation value to the preset glue width is greater than 10% or the ratio of the second deviation value to the preset glue height is greater than 10%, the display module is abandoned for glue-dispensing.

Figure 8:
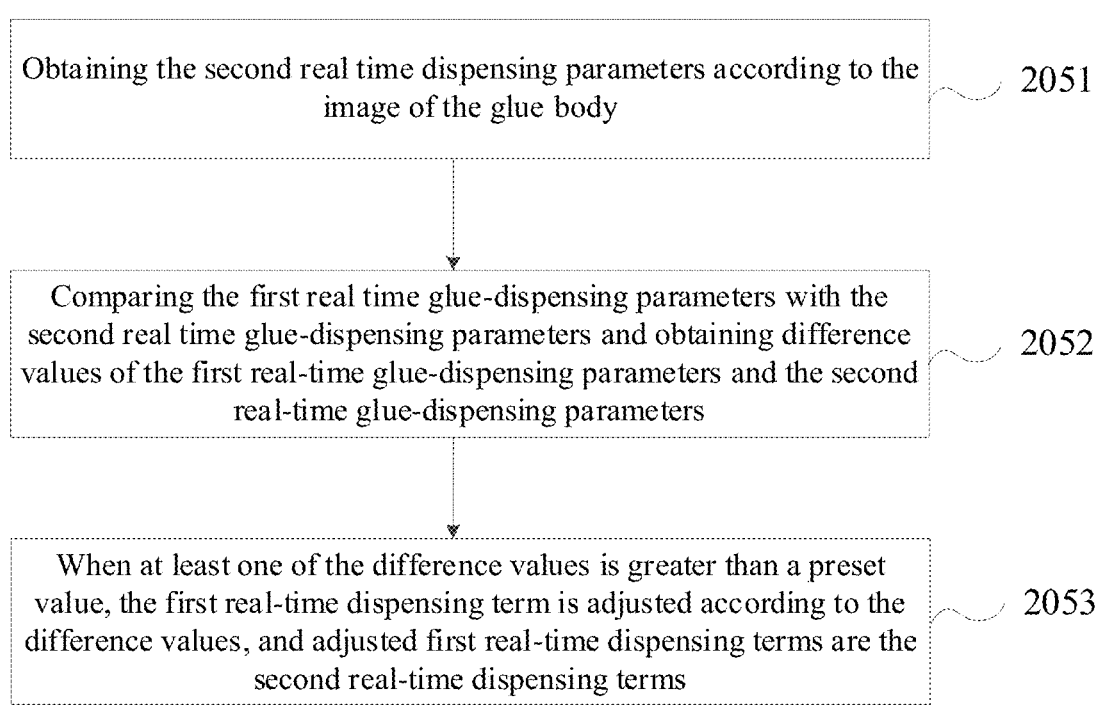
FIG. 8 is a third sub-flow diagram of a glue-dispensing method of a display module provided by an embodiment of the present disclosure.

FIG. 8 is a third sub-flow diagram of a glue-dispensing method of a display module provided by an embodiment of the present disclosure. As shown in FIG. 8, the step 205 includes:

Step 2051: obtaining the second real time dispensing parameters according to the image of the glue body.

It should be noted that a 2D laser profiler or a 2.5D camera is used to obtain the second real time glue-dispensing parameters. The second real time glue-dispensing parameters include a glue width and a glue height of the glue body formed by glue-dispensing the display module.

Specifically, the 2.5D camera illuminates from different angles by controlling a light source, so as to obtain a shadow image generated by image concave-convex information of the glue body. Through image information in the shadow image of the glue body, the width and a length of the glue body can to be obtained. The height of the glue body can to be obtained through grayscale information in the shadow image of the glue body.

Specifically, the 2D laser profiler can scan plane information and height information of the glue body. Therefore, the height, the width, and the length of the glue body can be directly obtained by using the 2D laser profiler.

It should be noted that when the 2D laser profiler or the 2.5D camera is used to scan the glue body to obtain the second real time glue-dispensing parameters, the 2D laser profiler and the glue body are in a vertical state, and the 2.5D camera is disposed right above the glue body.

Step 2052: comparing the first real time glue-dispensing parameters and the second real time glue-dispensing parameters and obtaining difference values of the first real time glue-dispensing parameters and the second real time glue-dispensing parameters.

Step 2053: when at least one of the difference values is greater than a preset value, the first real time glue-dispensing terms are adjusted according to the difference values, and adjusted first real time glue-dispensing terms are the second real time glue-dispensing terms.

It should be noted that the preset value is 0.1 micrometer. When each of the difference values is less than or equal to 0.1 micrometers, glue type specifications after glue-dispensing basically meet the requirements, and do not cause the bad phenomena such as a glue dent, light leakage, and glue height. Therefore, when each of the difference values is less than or equal to 0.1 micrometer, the second real time glue-dispensing terms do not need to be set, and the subsequent display module can be glue-dispensed by using the first real time glue-dispensing terms.

Figure 9:
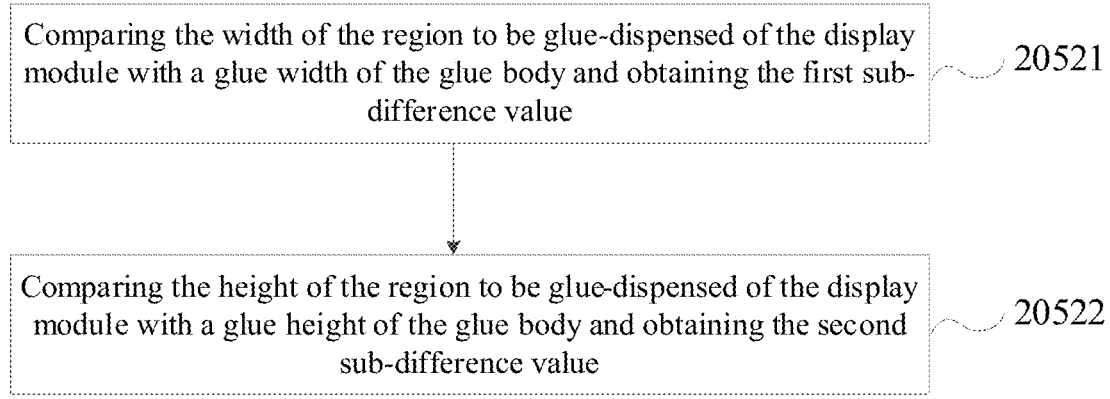
FIG. 9 is a fourth sub-flow diagram of a glue-dispensing method of ta display module provided by an embodiment of the present disclosure.

FIG. 9 is a fourth sub-flow diagram of the glue-dispensing method of a display module provided by an embodiment of the present disclosure. As shown in FIG. 9, the step 2052 includes:

Step 20521: comparing the width of the region to be glue-dispensed of the display module with a glue width of the glue body and obtaining the first sub-difference value.

Step 20522: comparing the height of the region to be glue-dispensed of the display module with a glue height of the glue body and obtaining the second sub-difference value.

It should be noted that the first real time glue-dispensing parameters include the height and the width of the region to be glue-dispensed of the display module. The second real time glue-dispensing parameters include the glue width of the glue body and the glue height of the glue body.

The difference values include a first sub-difference value and a second sub-difference value. The first sub-difference value is a difference value between the width of the region to be glue-dispensed of the display module and the glue width of the glue body. The second sub-difference value is a difference value between the height of the region to be glue-dispensed of the display module and the glue height of the glue body.

Only when the first sub difference value and the second sub-difference value are less than or equal to 0.1 micrometer, the second real time glue-dispensing terms do not need to be set, and the first real time glue-dispensing terms are used to glue-dispense the subsequent display module. When the first sub-difference value is greater than 0.1 micrometer or the second sub-difference value is greater than 0.1 micrometer, the second real time glue-dispensing terms need to be set, and the second real time glue-dispensing terms are used to glue-dispense the subsequent display module.

Figure 10:
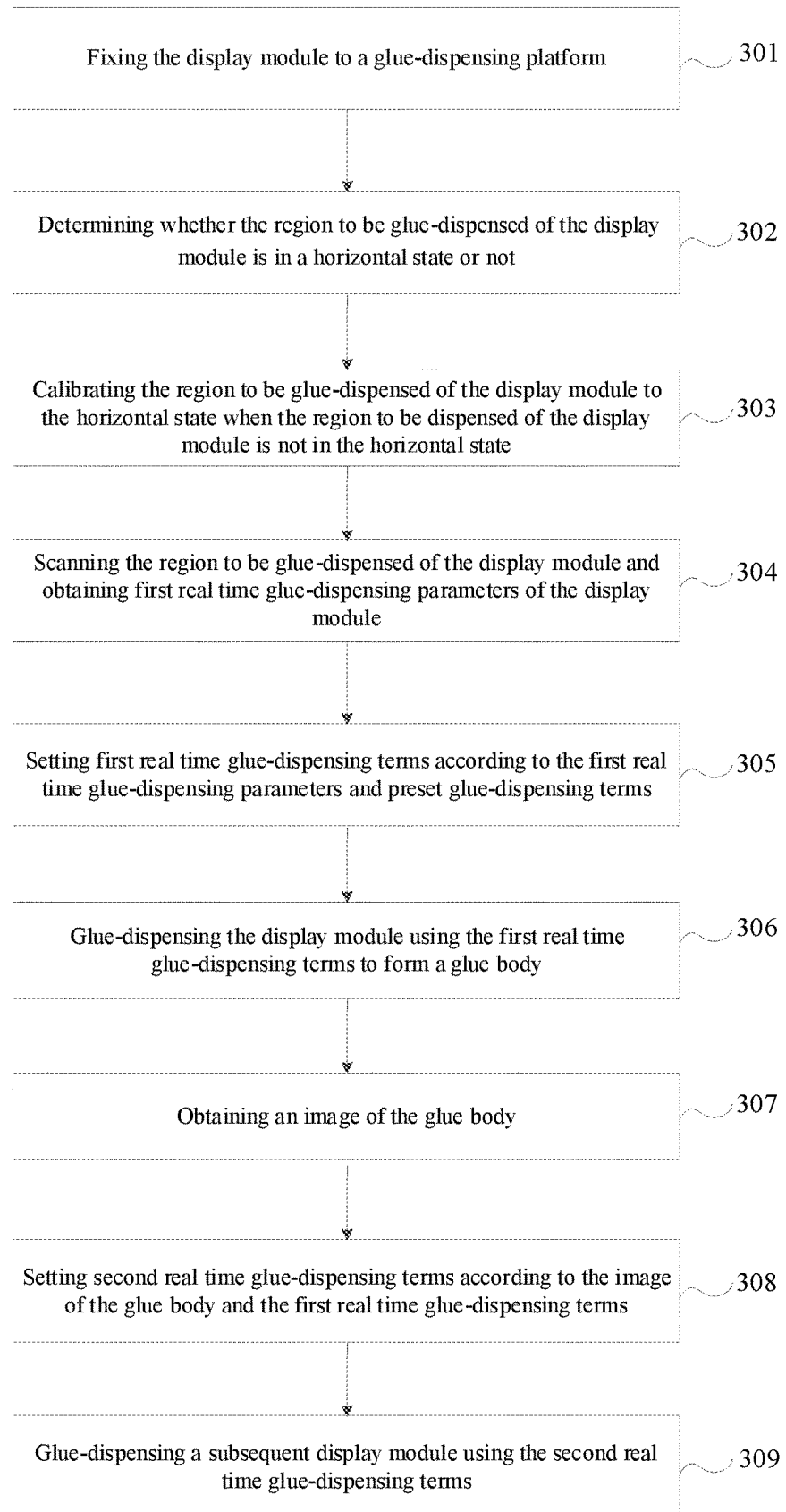
FIG. 10 is a second flow diagram of a glue-dispensing method of a display module provided by an embodiment of the present disclosure.

Refer to FIG. 10, FIG. 10 is a second flow diagram of a glue-dispensing method of a display module provided by an embodiment of the present disclosure. The difference between a glue-dispensing method in this embodiment and the glue-dispensing method of the above embodiments is that before the step of scanning a region to be glue-dispensed of the display module, the method further includes:

Fixing the display module to a glue-dispensing platform.

Determining whether the region to be glue-dispensed of the display module is in a horizontal state or not.

Calibrating the region to be glue-dispensed of the display module to the horizontal state when the region to be dispensed of the display module is not in the horizontal state.

Optionally, as shown in FIG. 10, the glue-dispensing method of the display module includes the following steps:

Step 301: fixing the display module to a glue-dispensing platform.

Step 302: determining whether the region to be glue-dispensed of the display module is in a horizontal state or not.

Step 303: calibrating the region to be glue-dispensed of the display module to the horizontal state when the region to be dispensed of the display module is not in the horizontal state.

It should be noted that the height of the region to be glue-dispensed of the display module is determined by measuring a distance between positioning points on a same side edge and a same horizontal plane of a glue-dispensing head. When the region to be glue-dispensed of the display module is not in the horizontal state, the height of the region to be glue-dispensed of the display module measured is inaccurate.

Step 304: scanning the region to be glue-dispensed of the display module, and obtaining first real time glue-dispensing parameters of the display module.

It should be noted that the display module includes a first side edge, a second side edge, a third side edge, and a fourth side edge which are sequentially connected end to end. The first side, the second side, the third side and the fourth side are surrounded in a rectangular shape. The display module includes a binding region and a display region which are connected to each other. Because the binding region of the display module does not need to be glue-dispensed. Therefore, it is only necessary to glue-dispense the first side edge, the second side edge and the third side edge of the display region.

It should be noted that after scanning the region to be glue-dispensed located on the first side, the glue-dispensing platform is rotated by ninety degrees, and then the region to be glue-dispensed located on the second side is scanned.

It should be noted that the first side edge and the second side edge are perpendicular to each other. Therefore, the glue-dispensing platform is rotated by ninety degrees. Since the first side edge is in the horizontal state, the second side edge is also in the horizontal state. Therefore, the region to be glue-dispensed located on the second side edge is able to be directly scanned, and there is no error in obtained first real time glue-dispensing parameters.

It should be noted that after scanning the region to be glue-dispensed located on the second side edge, the glue-dispensing platform is rotated by ninety degrees, and then the region to be glue-dispensed located on the third side is scanned.

It should be noted that the second side edge and the third side edge are perpendicular to each other. Therefore, the glue-dispensing platform is rotated by ninety degrees. Since the second side edge is in the horizontal state, the third side edge is also in the horizontal state. Therefore, the region to be glue-dispensed located on the third side edge is able to be directly scanned, and there is no error in obtained first real time glue-dispensing parameters.

It should be noted that during process of rotating the glue-dispensing platform, the glue-dispensing platform may be rotated clockwise or counterclockwise, but it is necessary to ensure that directions of two rotations are same.

Step 305: setting first real time glue-dispensing terms according to the first real time glue-dispensing parameters and preset glue-dispensing terms.

Step 306: glue-dispensing the display module using the first real time glue-dispensing terms to form a glue body.

Step 307: obtaining an image of the glue body.

Step 308: setting second real time glue-dispensing terms according to the image of the glue body and the first real time glue-dispensing terms.

Step 309: glue-dispensing a subsequent display module using the second real time glue-dispensing terms.

In the glue-dispensing method of the display module provided in the present disclosure, after the display module is fixed to the glue-dispensing platform, the region to be glue-dispensed of the display module is scanned in real time. And glue-dispensing terms are adjusted in real time according to scanning results, so as to realize different glue-dispensing glue bodies required by different glue-dispensing regions during the glue-dispensing process of the display module. And the glue bodies formed by glue-dispensing are confirmed, the glue-dispensing terms are deeply fine-tuned according to the glue bodies. Therefore, the embodiments of the present disclosure are able to achieve advanced prevention, process avoidance, detection effect after completion, and depth compensation according to the effect, thereby preventing the bad phenomena such as glue dent, light leakage, and high glue, etc., and further improving the yield of the display module.

The glue-dispensing method of the display module and the glue-dispensing device of the display module provided in the embodiments of this disclosure are described in detail above. Specific examples are used to explain the principle and implementation of the present disclosure, the descriptions of the above embodiments are only used to help understand the present disclosure technical solutions and their core ideas. Those of ordinary skill in the art, according to core ideas of the present disclosure, there may be changes in specific embodiments and application ranges. In summary, content of the present specification should not be construed as limiting the present disclosure.

What is claimed is:

1. A glue-dispensing method of a display module, comprising:
    scanning a portion to be glue-dispensed of the display module and obtaining first real time glue-dispensing parameters of the display module, wherein the first real time glue-dispensing parameters of the display module comprise a height and a width of the portion to be glue-dispensed of the display module;
    setting first real time glue-dispensing terms according to the first real time glue-dispensing parameters and preset glue-dispensing terms, the preset glue-dispensing terms comprise a single point glue amount, a single point diameter, and a glue-dispensing frequency;
    glue-dispensing the display module using the first real time glue-dispensing terms to form a glue body, a glue height and a glue width of which is matched with the height and the width of the portion to be glue-dispensed of the display module, respectively;
    obtaining an image of the glue body;
    setting second real time glue-dispensing terms according to the image of the glue body and the first real time glue-dispensing terms; and
    glue-dispensing a subsequent display module using the second real time glue-dispensing terms.

2. The glue-dispensing method of the display module of claim 1, wherein the step of setting the first real time glue-dispensing terms according to the first real time glue-dispensing parameters and the preset glue-dispensing terms comprises following steps:
    comparing preset glue-dispensing parameters and the first real time glue-dispensing parameters and obtaining offset data;
    setting the first real time glue-dispensing terms based on the preset glue-dispensing terms and according to the offset data when each of the offset data satisfies a preset term.

3. The glue-dispensing method of the display module of claim 2, wherein the preset term is that each of ratios of each of the offset data to each of parameters corresponding to the preset glue-dispensing parameters is less than or equal to 10%.

4. The glue-dispensing method of the display module of claim 2, wherein the preset glue-dispensing parameters comprise a preset glue width and a preset glue height, and the offset data comprises a first deviation value and a second deviation value; the step of comparing the preset glue-dispensing parameters and the first real time glue-dispensing parameters and obtaining the offset data comprises following steps:
    comparing the preset glue width with the width of the portion to be glue-dispensed of the display module and obtaining the first deviation value;
    comparing the preset glue height with the height of the portion to be glue-dispensed of the display module, and obtaining the second deviation value.

5. The glue-dispensing method of the display module of claim 1, wherein the step of setting the second real time glue-dispensing terms according to the image of the glue body and the first real time glue-dispensing terms comprises following steps:
    obtaining the second real time glue-dispensing parameters according to the image of the glue body;
    comparing the first real time glue-dispensing parameters and the second real time glue-dispensing parameters and obtaining difference values of the first real time glue-dispensing parameters and the second real time glue-dispensing parameters;
    setting the second real time glue-dispensing terms based on the first real time glue-dispensing terms and according to the difference values when at least one of the difference values is greater than a preset value.

6. The glue-dispensing method of the display module of claim 5, wherein the preset value is 0.1 micrometer.

7. The glue-dispensing method of the display module of claim 5, wherein the difference values comprise a first sub-difference value and a second sub-difference value; the step of comparing the first real time glue-dispensing parameters and the second real time glue-dispensing parameters and obtaining the difference values of the first real time glue-dispensing parameters and the second real time glue-dispensing parameters comprises following steps:
    comparing the width of the portion to be glue-dispensed of the display module with the glue width of the glue body and obtaining the first sub-difference value;
    comparing the height of the portion to be glue-dispensed of the display module with the glue height of the glue body and obtaining the second sub-difference value.

8. The glue-dispensing method of the display module of claim 1, wherein before the step of scanning the portion to be glue-dispensed of the display module, the method further comprising:
    fixing the display module to a glue-dispensing platform;
    determining whether the portion to be glue-dispensed of the display module is in a horizontal state or not;
    calibrating the portion to be glue-dispensed of the display module to the horizontal state when the portion to be glue-dispensed of the display module is not in the horizontal state.

* * * * *